EDWARD E. BURNHAM, OF GLOUCESTER, MASSACHUSETTS, ASSIGNOR TO HIMSELF AND GEORGE BROWN, OF THE SAME PLACE.

Letters Patent No. 84,855, dated December 15, 1868.

IMPROVED MODE OF PRESERVING BAIT FOR FISHING.

The Schedule referred to in these Letters Patent and making part of the same.

*To all persons to whom these presents may come:*

Be it known that I, EDWARD E. BURNHAM, of Gloucester, in the county of Essex, and State of Massachusetts, have made a new and useful invention, having reference to the Preservation and Improvement of Fish or Bait used in Catching Fish; and I do hereby declare the same to be fully described in the following specification.

It is well known that various kinds of fish are employed as bait by fishermen, and that it has long been very desirable to obtain some means of preserving such from natural decomposition, in order that a fishing-vessel, after having taken in a supply of bait and sailed for a fishing-locality, may not be obliged to return to port for bait until the supply may have been exhausted by the demand for it for the purposes of fishing. To preserve bait from decay or decomposition, refrigerators, or ice-chests or chambers, have been used, but they are seldom found to operate to any practical advantage, and, besides, are very expensive, and take up, on board of a vessel, a great deal of room that may be otherwise employed to advantage.

By my invention, fish-bait, whether it be from shell or any other kind of fish, is not only greatly improved for fishing and for other purposes, but may be preserved from decay or decomposition for several weeks, if not a much longer period, thus enabling a fishing-vessel, provided with my improved bait, to make a much longer voyage, before returning to port for bait, than it otherwise could. Although decomposition in dead fish may be prevented by the use of chloride of sodium, or common salt, or by smoking the fish, yet such destroys the fish for bait, as is well known to fishermen.

With my invention, many kinds of fish, which, on account of their softness, cannot be employed for bait, may be rendered so hard or tough and palatable as to be of great service as bait.

In carrying out my invention, I immerse the fish in a saturated solution of lime, keeping in the water an excess of lime beyond what may be necessary to make what is usually termed lime-water. In such solution I allow the fish to remain until wanted for use, when, if desirable, it may be removed and washed in common water.

In relation to the action of lime-water, containing some suspended lime, on fish organisms, I find two principal prominent features. Lime-water, with lime, acts on the oily proteine, matter of the organism, to render it firmer, less easily penetrated by air, and less susceptible to the influence of water or moisture, the action of the saturated solution resulting in rendering the structure less disposed to decompose in warm air. The lime and water prevent the germination of those matters which, primarily, are the agents of decay in fish-flesh. The microscopical germs of fermentation are destroyed by the agency of the solution, as an alkaline liquid, and the lime unites with and renders insoluble those juices which cause putridity in its first stages. The fish, placed in lime-water containing an excess of lime, are excluded from the action of the atmosphere at the moment when the chemical changes which result in decay commence, and, if sufficient time for saturation be allowed, the fish may next be exposed to air for a long period of time, without putrefaction commencing to take place.

The usual application of lime has been to effect the destruction of animal matter, in which case, the lime has been employed in a caustic state, in the form of quick-lime, which has been thrown upon the body or carcass.

My invention is of an entirely different character, as I employ a saturated solution of lime, the water serving, with the excess of lime, to produce preservative and other highly useful effects.

The fish, treated with the solution, seem to be greatly improved as bait. They are not only rendered tougher, so as not to be easily detached or torn from a hook by a fish, but from some cause appear to be rendered more attractive to fish.

The advantages of this invention to the fishing-interests of this country are incalculable. It will often insure success to a voyage which, without it, would result in a serious loss. It will save, in most if not all cases, any necessity of a return to port for bait during a voyage. It enables a fisherman, when on a bait-ground, to there prepare his bait for use at a very much greater distance than he could otherwise venture to go in pursuit of fish.

As the action of the lime and water is such upon the fish-flesh as to modify it more or less, and render it better for the purposes described, I consider the bait so prepared as a new manufacture or product.

Fish so treated, especially if washed after having been taken from the solution, may be eaten with impunity, by man or beast; and, from the experiments I have made, I have reason to believe that many strong, oily fish, such as are excluded from use as food or bait, by reason of their disagreeable taste or qualities, may be so improved by my treatment as to be utilized to advantage.

I make no claim to the ordinary use of quick-lime for the destruction of the body of an animal, such forming no part of my invention.

What I claim as my invention is as follows:—

I claim the treatment of fish or bait by the employment of the saturated solution, as and in manner as hereinbefore specified.

Also, the improved fish-bait, as made by exposure of fish or fish-flesh to the action of the saturated solution, as and in the manner as hereinbefore explained.

EDWARD E. BURNHAM.

Witnesses:
D. D. SAUNDERS.
A. W. DAVIS.